United States Patent
Kadota et al.

(10) Patent No.: US 6,388,760 B2
(45) Date of Patent: *May 14, 2002

(54) HOST-BASED PRINTING SYSTEM AND PRINTING CONTROL METHOD THEREOF

(75) Inventors: Masatoshi Kadota, Takahama; Tsuyoshi Yamanaka, Komaki, both of (JP)

(73) Assignee: Brother Kogyo Kabushiki Kaisha, Nagoya (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/807,811

(22) Filed: Feb. 26, 1997

(30) Foreign Application Priority Data

Feb. 26, 1996 (JP) .......................................... P8-038369
Mar. 1, 1996 (JP) .......................................... P8-044909

(51) Int. Cl.$^7$ ................................................ B41B 1/00
(52) U.S. Cl. ...................... 358/1.14; 358/1.13; 358/1.15
(58) Field of Search .................................. 395/110, 112, 395/113, 114, 115; 358/1.13, 1.14, 1.15, 1.16, 1.17, 1.2, 116, 444; 399/19, 21, 391; 271/288, 9.02, 9.03

(56) References Cited

U.S. PATENT DOCUMENTS

| | | | | |
|---|---|---|---|---|
| 4,958,298 A | * | 9/1990 | Okamoto | 395/113 |
| 4,979,132 A | * | 12/1990 | Sugimoto | 395/113 |
| 5,473,735 A | * | 12/1995 | Murakami | 358/116 |
| 5,604,845 A | * | 2/1997 | Kenel | 395/113 |
| 5,664,074 A | * | 9/1997 | Kageyama | 358/1.14 |
| 5,684,934 A | * | 11/1997 | Chen et al. | 395/113 |
| 5,864,652 A | * | 1/1999 | Murahashi | 358/1.16 |

* cited by examiner

Primary Examiner—Samir Ahmed
(74) Attorney, Agent, or Firm—McGinn & Gibb, PLLC (57) ABSTRACT

A host-based printing system in which error conditions are monitored. If a print overrun error occurs, in which the printing speed is faster than the transfer speed, a busy signal is sent to the computer to stop transmission of data for a sufficient amount of time, and the printer is reset. When data transmission from the host computer resumes, data is discarded until the end of the page, allowing the printing process to recover smoothly.

13 Claims, 8 Drawing Sheets

HOST-BASED PRINTING SYSTEM AND PRINTING CONTROL METHOD THEREOF

BACKGROUND OF THE INVENTION

1. Field of the Invention

The present invention relates to a host-based printing system and printing control method thereof.

2. Description of the Related Art

Host-based printing systems have been proposed in recent years. Generally used printers receive printing data from a host computer and convert the same into image data for printing, such as bit-mapped data whereas the host-based printers receive the bit-mapped data or compressed bit-mapped data created at a host computer. Generally, the image data output from the host computer is compressed. The host-based printer expands the received compressed image data and relays the resultant data to a printer engine. Because the host-based printer needs only perform data expansion, burden on the host-based printer is greatly relieved. This allow employing a CPU of low processing capability and/or a memory of small storage capacity in the host-based printer. As such, the host-based printers can be manufactured at low cost.

There are such printers that cannot temporarily stop during printing. Laser printers are an example of such printers. Such a printer has a buffer memory in which one page worth of image data is stored so that the supply of the image data to the printer will not be interrupted during printing. Some of the printers have a reprinting capability. When a printing error, such as a paper jam, occurs during printing, the printer can automatically reprint the page which was not produced as a result of the printing error. This reprinting can be achieved by using the one page worth of image data stored in the buffer memory of the printer.

However, provision of a buffer memory with one page worth of print data storing capability increases the cost of the printer. To lower the cost and provide a low-price product, a memory of small storage capacity is mounted in recent host-based printers. Because one page worth of image data cannot be stored in the buffer memory in such printers, reprinting of a page cannot be performed automatically when a printing error occurs but the operator has to operate the printer again to perform printing of the page.

In the host-based printing systems, the image data output from the host computer is stored temporarily in a buffer memory within the printer. With a page printer, image data is stored in the buffer memory until the end of the page, providing the page of image data is small enough to fit into the buffer memory, and then the printing unit is activated to print the page. If a page of image data is larger than the capacity of the buffer memory, however, the printing unit is activated when the buffer memory becomes full. Hereinafter, this method of starting to print a page before the end of the page has been transferred will be referred to as "printing on the fly."

When printing on the fly with a page printer, the buffer memory may become empty in the middle of a page if transferring of image data from the computer is slow, and the printer will be unable to print. This condition in which printing is impossible will hereinafter be referred to as "print overrun."

When an error occurs due to a paper jam, for example, while printing on the fly with such a page printer, the host computer stops outputting image data in the middle of a page. Then, after the jammed paper is removed and the printer is reset, the host computer will continue outputting the remaining image data in the page. However, data for the first part of the page was lost when the printer was reset. Thus, even if data for the latter part of the page is sent to the printer, the printer will be unable to process that data as specifications for data length, for example, will be missing, resulting in an illegal command error.

Sometimes an error recovery function is provided to resend image data from the host computer for a page in which an error occurred, but when print overrun occurs, the same error may recur due to relationships between the printer buffer capacity, the data size of one page, and the transfer speed from the host computer. For this reason, when an error recovery function is set in conventional host-based printing systems and a print overrun occurs, the same error occurs repeatedly, and the function is ineffective.

SUMMARY OF THE INVENTION

In view of the foregoing, it is an object of the present invention to provide a host-based printing system and a printing control method thereof capable of automatically reprinting a page that could not be printed as a result of a printing error regardless of the storage capacity of a buffer memory of a printer.

It is another object of the present invention to provide a host-based printing system and a printing control method thereof that can smoothly recover from a printing error.

To achieve the above and other objects, there is provided a printing control method of a host-based printing system that includes a host computer and a printer connected to the host computer, the printing control method including the steps of:

(a) creating, in the host computer, image data for printing;

(b) outputting the image data created in the host computer to the printer;

(c) printing, in the printer, the image data on a page basis;

(d) when a printing error occurs in the printer during the step (c) before the printing the image data for one page the printing error occurred in was completely output from the host computer to the printer, recovering the printing error, and thereafter outputting remaining image data for the one page to the printer; and (e) discarding, in the printer, the remaining image data for the one page output from the host computer.

The method may further include the following steps:

(f) determining whether the printing error is of a recurring type or a nonrecurring type;

(g) when the determination made in step (f) indicates that the printing error is of the nonrecurring type, recovering the printing error, and thereafter resending to the printer the image data for the one page that the printing error occurred in instead of executing the step (d); and (h) printing the image data resent by the host computer instead of executing the step (e).

The steps (d) and (e) are executed when the determination made in step (f) indicates that the printing error is of the recurring type.

The method may further include the following steps:

(i) resetting the printer before outputting the remaining image data for the one page to the printer.

The method may further include the following steps:

(j) executing the step (i) when the determination made in step (f) indicates that the printing error is of the recurring type;

(k) after executing the step (j), outputting the image data for a subsequent one page to the printer instead of executing the step (d); and (l) printing the image data for the subsequent one page.

According to another aspect of the invention, there is provided a printing control method of a host-based printing system that includes a host computer and a printer connected to the host computer so as to be capable of performing a bi-directional communication therebetween, the printing control method including the steps of:

(a) creating, in the host computer, image data for printing;

(b) outputting the image data created in the host computer to the printer;

(c) printing, in the printer, the image data on a page basis;

(d) when a printing error occurs in the printer during the step (c) before the printing the image data for one page the printing error occurred in was completely output from the host computer to the printer, transmitting a reprint command from the printer to the host computer requesting to resend the image data for the one page the printing error occurred in, a part of the print data for the one page being left unprinted in the printer as a result of the printing error;

(e) clearing the part of the print data; and (f) in response to the reprint command received from the printer, resending the image data for the one page the printing error occurred in to the printer.

The host computer retains the image data that has been sent to the printer so as to be capable of resending the image data. The method may further include the following steps:

(g) sending information regarding a page that has been successfully printed in the printer to the host computer; and (h) discarding the print data retained by the host computer for the page that has been successfully printed in the printer.

According to still another aspect of the invention, there is provided a host-based printing system that includes: a host computer for creating image data for printing and transmitting the image data; a printer connected to the host computer for receiving and printing the image data on a page basis; output complete determination means for determining whether or not the image data for one page had been completely transmitted from the host computer when a printing error occurred; and discarding means for discarding a part of the image data for the one page which remains untransmitted from the host computer when the determination by the output complete determination means indicates that the image data for one page had not been completely transmitted. In this case, discharging the part of the image data is implemented after resetting the printer.

The discarding means is provided in the printer and discards the part of the image data after the part of the image data has been transmitted to the printer.

There may further be provided error recovery means for retransmitting the image data for the one page the printing error occurred in after the printer recovers from the printing error; printing error cause determination means for determining whether or not the printing error is of a type that will cause the same printing error to recur; and error recovery ignore means for disabling the error recovery means so that retransmitted image data is not printed by the printer when the determination by the printing error cause determination means indicates the printing error is of the type that will cause the same printing error to recur.

According to yet another aspect of the invention, there is provided a host-based printing system that includes: a host computer for creating image data for printing and transmitting the image data; a printer connected to the host computer for receiving and printing the image data on a page basis; printing error cause determination means for determining whether or not the printing error is of a type that will cause the same printing error to recur; and discarding means for discarding a part of the image data for the one page which remains untransmitted from the host computer when the determination by the printing error cause determination means indicates the printing error is of the type that will cause the same printing error to recur. Discharging the part of the image data is implemented after resetting the printer.

In this case also, the discarding means is provided in the printer and discards the part of the image data after the part of the image data has been transmitted to the printer.

According to further aspect of the present invention, there is provided a host-based printing system that includes: a host computer for creating image data for printing; a printer connected to the host computer for receiving and printing the image data on a page basis; output complete determination means for determining whether or not the image data for one page had been completely transmitted from the host computer when a printing error occurred; and retransmitting means for retransmitting the image data for the one page the printing error occurred in when the determination by the output complete determination means indicates that the image data for one page had not been completely transmitted, the image data being retransmitted after resetting the printer.

According to another aspect of the invention, there is provided a host-based printing system that includes: a host computer for creating image data for printing; a printer connected to the host computer for receiving and printing the image data on a page basis; printing error cause determination means for determining whether or not the printing error is of a type that will cause the same printing error to recur; and page skipping means for skipping the image data for the one page the printing error occurred in and transmitting the image data for a subsequent one page to the printer when the determination by the printing error cause determination means indicates the printing error is of the type that will cause the same printing error to recur. Transmitting the image data for the subsequent one page is implemented after resetting the printer.

According to still another aspect of the invention, there is provided a host-based printing system that includes: a host computer for creating image data and outputting the image data; a printer connected to the host computer for receiving and printing the image data on a page basis; and bi-directional communication lines for connecting the host computer to the printer so as to be capable of performing a bi-directional communication therebetween. The printer includes: print execution information output means for outputting print execution information to the host computer, the print execution information being representative of normally printed pages and print error pages; and data clear means for clearing, when a printing error occurred during printing the image data for one page, a part of the image data for the one page which remains unprinted as a result of the printing error. The host computer includes: image data retaining means for retaining the image data that has been output to the printer so as to repeatedly output to the printer; resending means for resending to the printer the image data for the one page that is indicated as a print error page in the print execution information; and discarding means for discarding the image data for a page that is retained in the image data retaining means and indicated as a normally printed page in the print execution information.

The printer may further include print results storing means for storing an accumulated number of printed pages and outputting the accumulated number of printed pages to the host computer. The host computer may further include printed pages specifying means for specifying a number of normally printed pages based on the accumulated number of printed pages output from the print results storing means before start of printing and an updated accumulated number of printed pages.

The host computer may further include output page managing means for managing a page whose image data has been output to the printer, and print error page specifying means for specifying print error pages based on the page managed by the output page managing means and the normally printed pages.

When the print error page specifying means specifies a print error page, the output page managing means indicates a page immediately preceding the print error page specified by the print error page specifying means.

According to yet further aspect of the invention, there is provided a host-based printing system that includes: a host computer for creating image data; a printer connected to the host computer for receiving and printing the image data on a page basis; image data retaining means for retaining the image data; start page managing means for managing a start page of the image data stored in the image data retaining means; and page managing means for managing an end page of the image data stored in the image data retaining means; output page managing means for managing an output page which has been sent to the printer; and output data specifying means for specifying the image data for a subsequent page to be sequentially output to the printer based on a relationship between the output page and the end page.

The start page managing means specifies the normally printed page based on information received from the printer and rewrites the start page based on the normally printed page specified by the start page managing means. The output page managing means specifies the print error page based on information received from the printer and rewrites the output page based on the print error page specified by the output page managing means.

BRIEF DESCRIPTION OF THE DRAWINGS

The particular features and advantages of the invention as well as other objects will become apparent from the following description taken in connection with the accompanying drawings, in which.

DETAILED DESCRIPTION OF THE PREFERRED EMBODIMENT

A host-based printing system according to a preferred embodiment of the present invention will be described while referring to the accompanying drawings wherein like parts and components are designated by the same reference numerals to avoid duplicating description.

Figure 1:
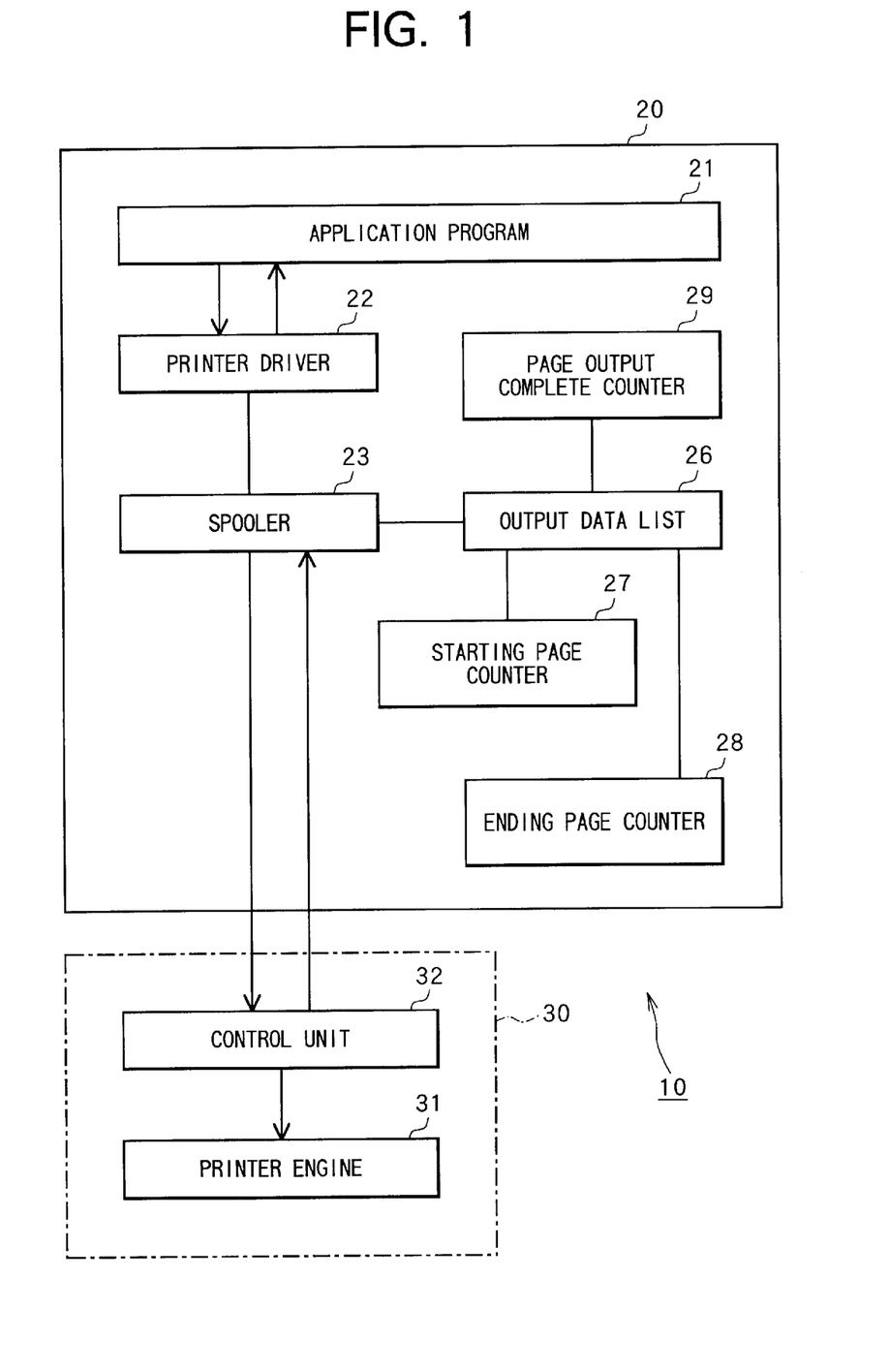
FIG. 1 shows the general configuration of a host-based printing system of the embodiments.

As shown in FIG. 1, the host-based printing system 10 of the present embodiment includes a host computer 20 and a laser printer 30. The host computer 20 and laser printer 30 are connected electrically via a parallel data transmission/reception cable. Dot image data is created with the host computer 20 and transferred to the laser printer 30 for printing. The host computer 20 transfers compressed image data, which the laser printer 30 expands and prints. The parallel data transmission/reception cable conforms to the IEEE 1284 standard and can transfer data from the laser printer 30 to the host computer 20.

The host computer 20 includes a personal computer provided with a CPU, RAM, ROM, hard drive, I/O interface, and the like; and such functional components as an application program 21 and a printer driver 22 for creating output data. The application program 21 can be a word processor or CAD application program, for example, with printing functions. The printer driver 22 develops and compresses image data corresponding to printing data for the laser printer 30. The resulting data is the output data.

The host computer 20 also includes a spooler 23 for accumulating output data in an output data list 26 and transferring the output data in the output data list 26 to the laser printer 30. This spooler 23 can be considered as one of the functions of the printer driver 22 or as an independent function. The output data list 26, more specifically, is constructed with a storage device such as a hard drive.

The host computer 20 also includes a starting page counter 27, an ending page counter 28, and a page output complete counter 29 for managing the output data list 26. The starting page counter 27 and ending page counter 28 indicate the first and last pages, respectively, that are stored in the output data list 26. However, the ending page counter 28 indicates the last complete page. The page output complete counter 29 indicates the last page output to the laser printer 30. The counters 27, 28, and 29, more specifically, are constructed with RAM.

The host computer 20 can be used to set an error recovery function to resend data for a page in which an error occurred in the laser printer 30. The user can preset this error recovery function to either ON or OFF. The setting information for the error recovery function is then sent along with a command to the laser printer 30.

The host computer 20 manages data and output pages in the output data list 26 according to the counters 27–29 described above. More specifically, the page output complete counter 29 is incremented after one page of data has been output, indicating the next page that needs to be output. Hence, if an error occurs when the error recovery function described above is set to ON, the page output complete counter 29 is decremented one to return to the previous page, in order that the same page is output again.

The ending page counter 28 is incremented every time one page of data is stored in the output data list 26. Data is output only when this ending page counter 28 is of a larger value than the page output complete counter 29.

The starting page counter 27 is set to the number of pages that have been printed plus one. The number of pages that have been printed is determined based on a value stored in a nonvolatile memory 53 of the laser printer 30, which will be described later. The host computer 20 deletes all data from the output data list 26 for pages previous to the page specified by the starting page counter 27, in order to make efficient use of the storage space.

The laser printer 30 has a printer engine 31 including various mechanisms, such as a printing mechanism for printing by a laser light method and a paper feed mechanism, and a control unit 32 for controlling the various mechanisms of the printer engine 31. A more detailed description of the printer engine 31 will be omitted as it is well known in the art.

Figure 2A:
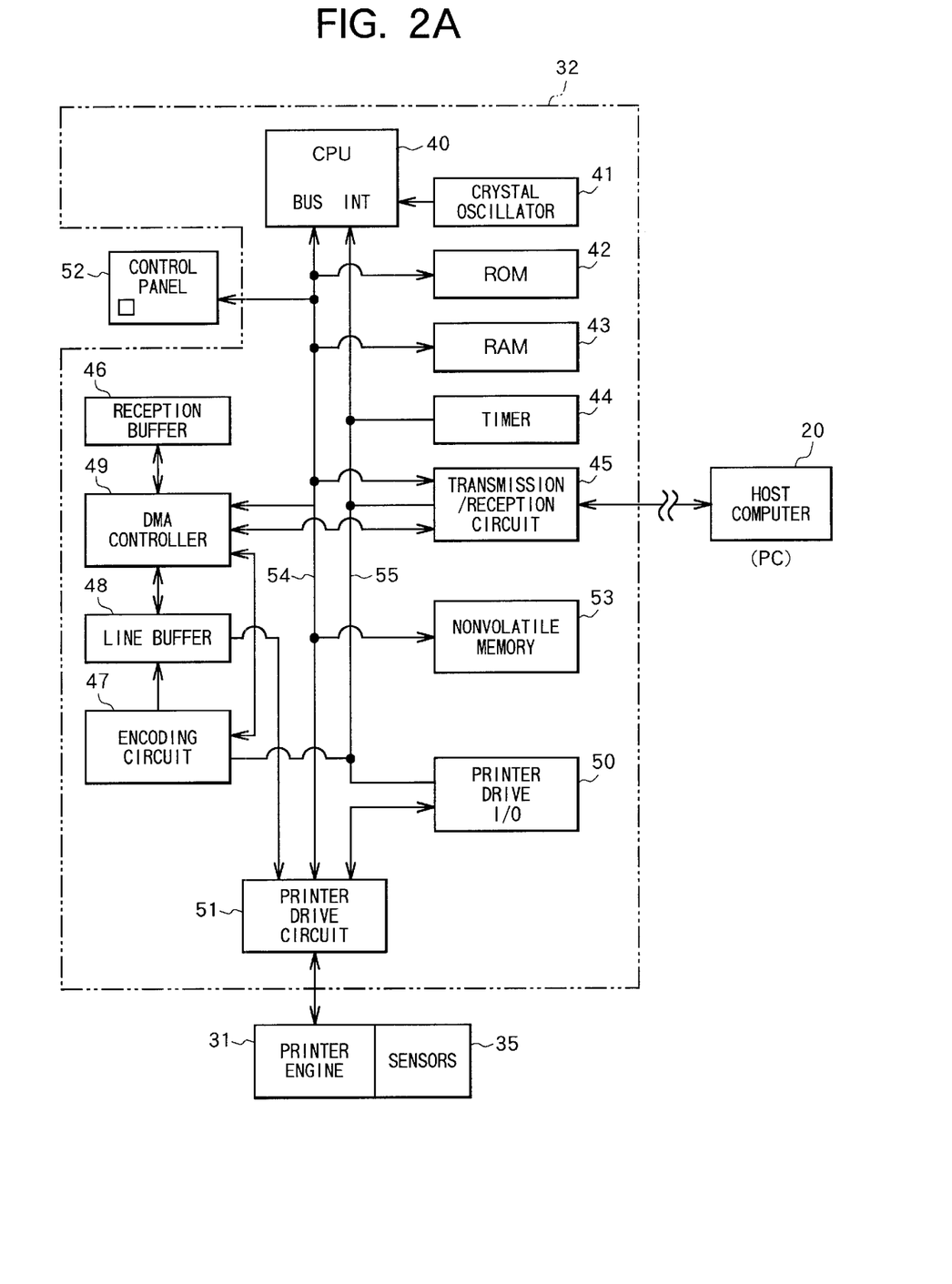
FIG. 2A shows the general configuration of a host-based printing system according to the first and second embodiments of the invention.

As shown in FIG. 2A, the control unit 32 is provided with a CPU 40; a crystal oscillator 41 for supplying a clock pulse to the CPU 40; a ROM 42 with a built-in printing control program; a RAM 43 provided with various work memories; a timer 44 used for time interruptions; a transmission/reception circuit 45 for transmission and reception between the host computer 20; a reception buffer 46; an encoding circuit 47 for encoding compressed image data received from the reception buffer 46; a line buffer 48 for temporarily storing image data encoded by the encoding circuit 47 before outputting the data as serial image data; a DMA controller 49 capable of directly accessing the reception buffer 46 and the line buffer 48; a printer drive I/O interface 50; a printer drive circuit 51; and a control panel 52. The control unit 32 also includes the nonvolatile memory 53 for storing the accumulated number of printed pages.

A bus 54 is provided for connecting the ROM 42, RAM 43, transmission/reception circuit 45. DMA controller 49, printer drive circuit 51, and nonvolatile memory 53 to the CPU 40. Also, an interrupt signal line 55 is provided for connecting the timer 44, transmission/reception circuit 45, printer drive I/O interface 50, and encoding circuit 47 to the CPU 40.

The DMA controller 49 is connected to the reception buffer 46 and the line buffer 48, and also to the encoding circuit 47.

Parallel compressed image data received from the host computer 20 via the transmission/reception circuit 45 is written to the reception buffer 46 by the DMA controller 49. Then, the image data is read from the reception buffer 46 and supplied to the encoding circuit 47 by the DMA controller 49, where it is encoded. Next, the encoded dot image data is supplied from the encoding circuit 47 to the line buffer 48. From the line buffer 48, the data is supplied as serial image data to the printer drive circuit 51, and the printer engine 31 is driven by drive signals corresponding to the dot image data.

When the printing of one page has completed, the CPU 40 increments the accumulated value stored in the nonvolatile memory 53 by 1. The printer engine 31 also includes various sensors 35, such as a paper jam sensor for detecting when paper has become jammed. The CPU 40 keeps track of what these sensors 35 detect.

The reception buffer 46 is configured as a so-called ring buffer. The DMA controller 49 controls the reading and writing of data by using a read pointer RP and a write pointer WP in the reception buffer 46. The read pointer RP indicating the data read address and the write pointer WP indicating the data write address will be explained using a schematic drawing.

Figure 3A:
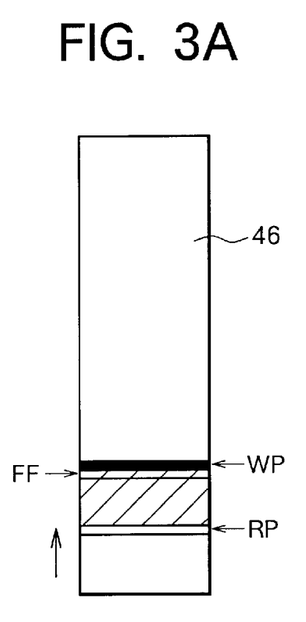
FIGS. 3A, 3B and 3C are schematic diagrams showing the relationships of the write pointer and read pointer with the reception buffer in a host-based printing system.
Figure 3B:
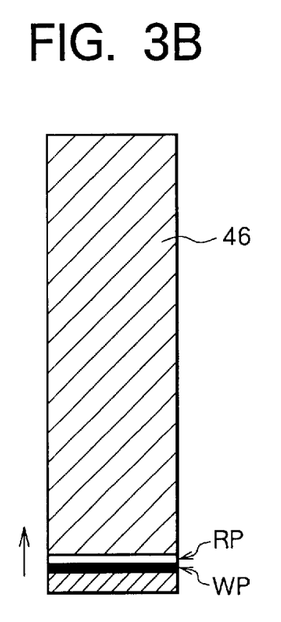
Figure 3C:
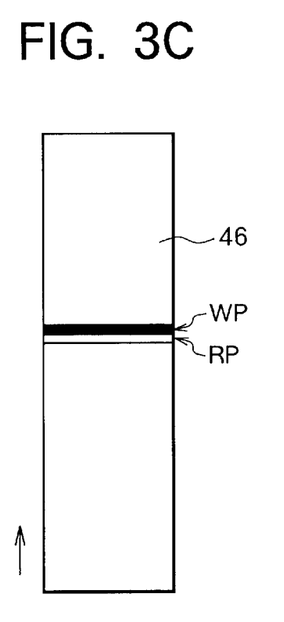

As shown in FIGS. 3A through 3C, data is written into the reception buffer 46 in the direction of the arrows, beginning from the bottom. When the writing position for the data reaches the top of the buffer, the writing begins again from the bottom of the buffer and continues in an upward direction. Reading of data is performed in the same manner, beginning from the bottom end, moving upward to the top end, and starting over from the bottom end. Hence the write pointer WP and read pointer RP also move in the direction indicated by the arrows. The relationship of the two pointers is such that the write pointer WP cannot overtake the read pointer RP. If the write pointer WP were to overtake the read pointer RP, new data would be written over data that had not yet been read. In the same way, the read pointer RP cannot overtake the write pointer WP, because the read pointer RP would attempt to read data from an area to which data had not yet been written.

FIGS. 3A through 3C show the different types of relationships that are possible between these two pointers. The areas with hatching in the drawings indicate memory areas storing unread data.

FIG. 3A corresponds to a case in which one page of data is smaller than the capacity of the reception buffer 46. Here, the write pointer WP stopped just after a form feed command FF, signifying the end of data, was written. Then the read pointer RP begins to move, and data is read.

In the case of FIG. 3B, one page of data is larger than the capacity of the reception buffer 46, and, hence, the entire page cannot be stored. Therefore, when the reception buffer 46 becomes full, the reading of data is begun while moving the read pointer RP. After the reading is completed, the writing continues. This process is what was referred to above as printing on the fly. In this situation, reading is begun before a form feed command FF is written. Thus, both the read pointer RP and the write pointer WP are in a state of continual movement. When WP=RP−1, a busy signal is given to prevent more data from being written and, thus, prevent the write pointer WP from overtaking the read pointer RP.

In the cases of FIGS. 3A and 3B, printing can be performed normally, but printing cannot be performed normally in case of FIG. 3C. In other words, when printing on the fly, the read pointer RP catches up to the write pointer WP, and printing cannot be performed do to the moving speeds of the two pointers. This situation is called print overrun. In print overrun, if the page is reprinted, the same error will recur due to the relationships of the size of data on the page, the capacity of the buffer, and the speeds of the pointers RP and WP.

The following is clear from the position relationships of the read pointer RP and the write pointer WP as described above.

(1) Printing on the fly is the condition in which the write pointer WP is directly behind the read pointer RP when printing begins.

(2) Print overrun is the condition in which the read pointer RP is directly behind the write pointer WP during printing.

Thus, the above conditions can be detected by checking the positions of the two pointers at the beginning of printing and during printing. Further, the condition (1) can be detected by checking whether both pointers are moving or not during printing.

Next, an error surveillance control in the host-based printing system 10 of the present embodiment will be described. In the present embodiment, this error surveillance control process is performed in the laser printer 30. A detailed structure of this process is given in FIG. 4. Hereinafter, the process of FIG. 4 will be called the first embodiment.

Figure 4:
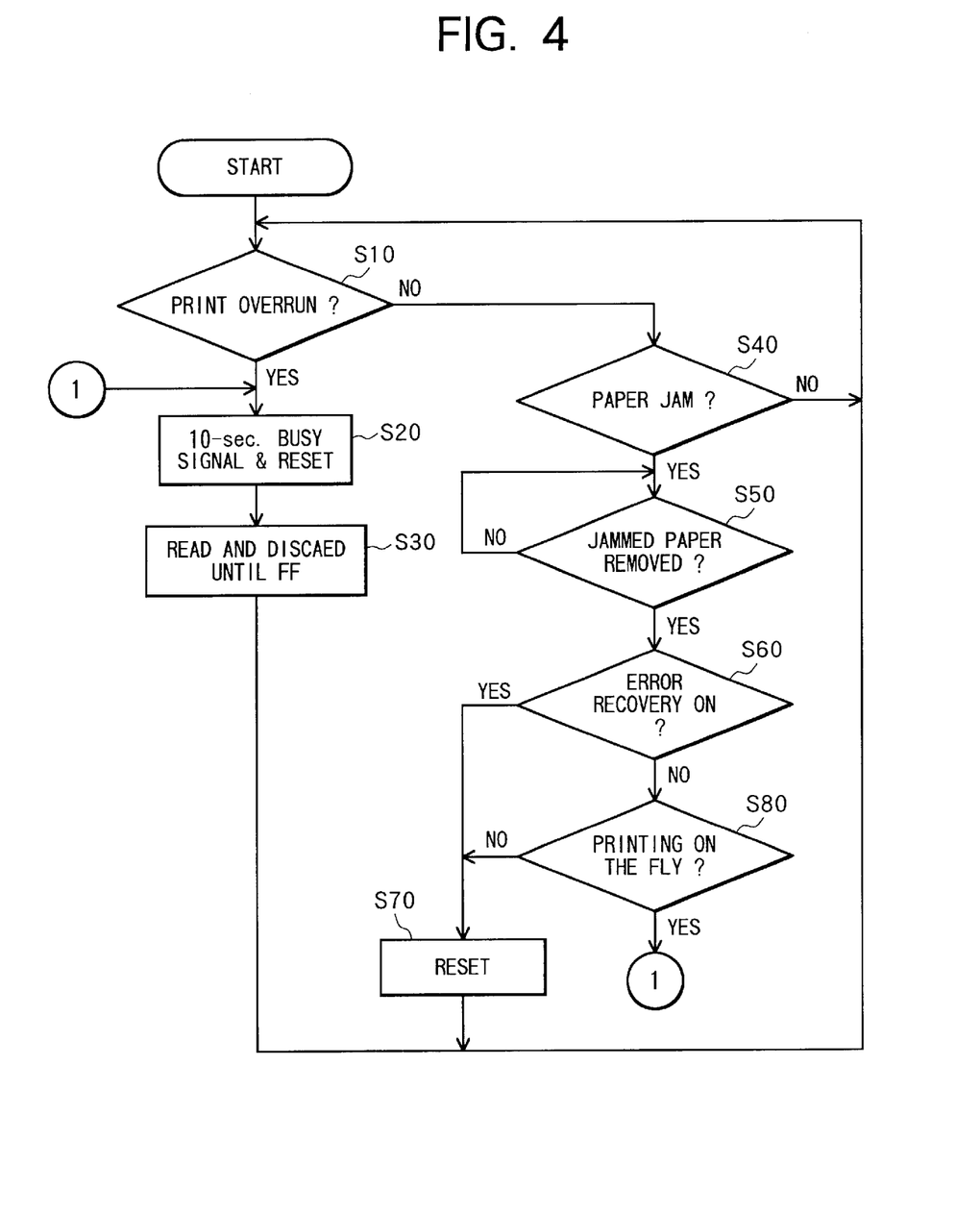
FIG. 4 is a flowchart showing the control process in a printer of the first embodiment of the invention.

In the error surveillance routine of the first embodiment, moving state of the read pointer RP and the write pointer WP by the DMA controller 49 is checked to determined whether condition (2), or print overrun, has occurred (S10). If the occurrence of a print overrun is determined (S10: yes), a BUSY signal is output to the host computer 20 for a sufficient length of time (about 10 seconds, for example), and a reset process is executed (S20). Data sent from the host computer 20 after the BUSY signal has stopped is read and discarded up to the form feed FF (S30).

At step S20, the host computer 20 stops transmitting data temporarily, but resumes the transmission of data when the BUSY signal stops. At this point, if the error recovery function is set to OFF, data transmission will continue from where it left off in the page when the error occurred. As the data transmitted is incomplete, the data is read to the end of the page and discarded to prevent an illegal command error from occurring.

If the error recovery function is set to ON, the data for the page in which the print overrun occurred will be retransmitted when transmission resumes. In this case, the complete data for the page will be transmitted, but, as described above, print overrun is a recurring error. Thus, to prevent the print overrun from recurring, in step S30 data will be read and discarded until the first form feed FF is read.

If, on the other hand, a print overrun has not occurred (S10: No), the paper jam sensor of the sensors 35 is checked to determine whether a paper jam has occurred (S40). If a paper jam has occurred (S40: Yes), the process is suspended until the cover on the printer has been opened and the jammed paper removed (S50).

After the paper jam has been cleared (S50: Yes), the process returns to S10 after reset (S70) if the error recovery function is set to ON (S60: Yes). The error recovery setting is determined from data sent together with a command from the host computer 20. If the error recovery function is set to OFF (S60: No), a printing on the fly condition is checked for from results of checking the positions of the pointers WP and RP at the start of printing (S80). If the printer is currently printing on the fly, the process shifts to step S20. Thus, when the error recovery function is set to OFF and the printer is printing on the fly, the host computer 20 will continue to transmit the remaining data for a page in which a paper jam occurred. The process shifts to step S20 to read and discard this remaining data.

On the other hand, if the printer is not printing on the fly the process returns to step S10 after performing a reset (S70). Because the printer is not printing on the fly, the host computer 20 will transmit data beginning from the top of the page following the page in which the paper jam occurred. This data need not be discarded.

Data is not read and discarded after a paper jam when the error recovery function is ON because a paper jam is not a data-caused error and, therefore, is not a recurring type of error. Thus, setting error recovery to ON will cause the page to be reprinted.

Therefore, in the present embodiment, print overrun and paper jam errors that occur when printing can be smoothly recovered from without causing an illegal command error to occur and without repeating the same error.

Next, the second embodiment of the present invention will be described.

Figure 5:
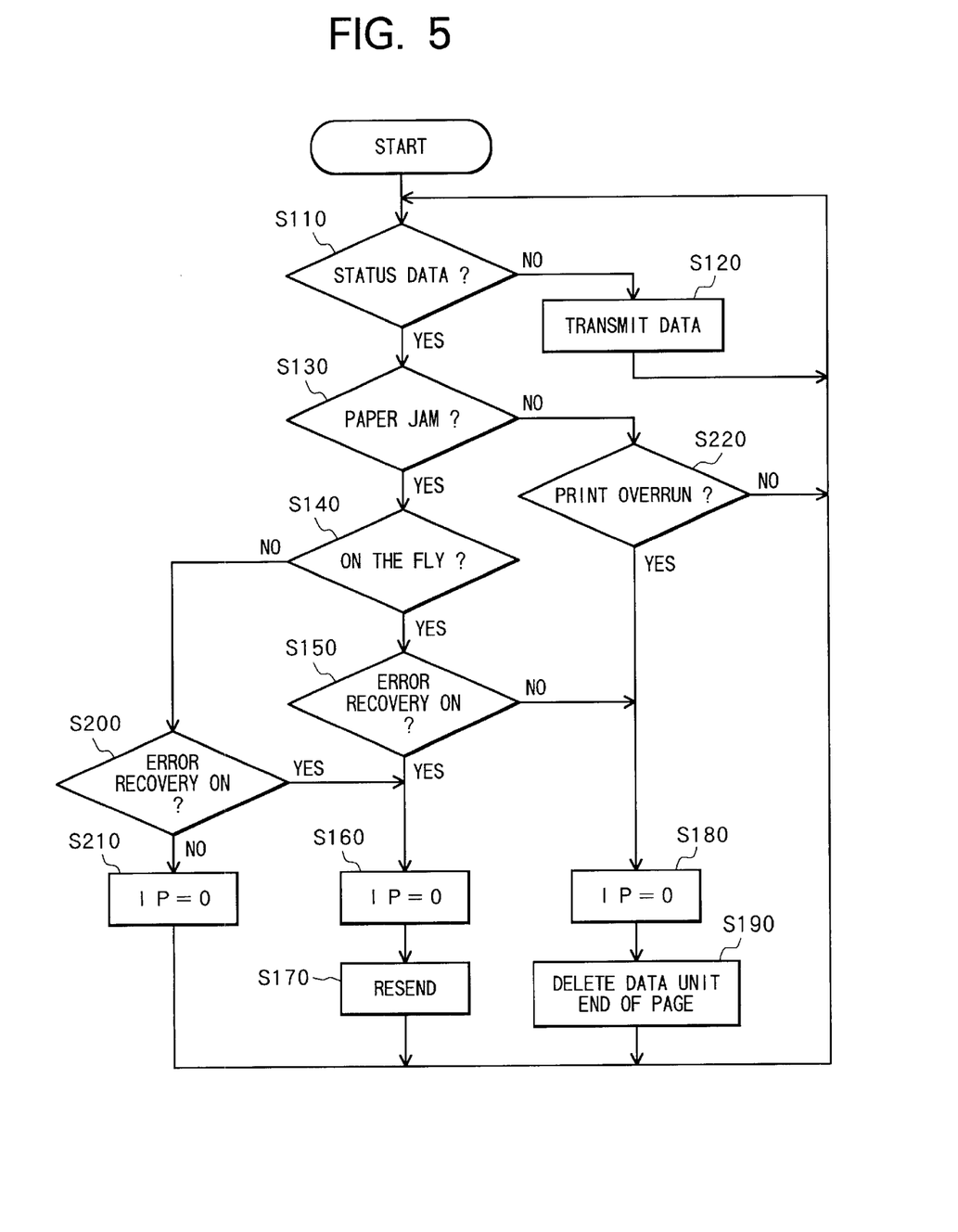
FIG. 5 is a flowchart showing the control process in a host computer of the second embodiment of the invention.

In the second embodiment, error surveillance control is performed in the host computer 20. As shown in FIG. 5, a printing control routine in the host computer 20 checks for status data from the laser printer 30 (S110).

In the present embodiment, status data is sent from the laser printer 30 to the host computer 20, and at least the messages "paper jam," "print overrun," and "print on the fly" can be distinguished in that status data. As in the first embodiment, the laser printer 30 detects conditions such as paper jam and print overrun by monitoring signals from the paper jam sensor of the sensors 35 and by checking the positions of the write pointer WP and the read pointer RP.

If there is no status data from the laser printer 30 (S110: No), the output data stored in the output data list 26 is transmitted to the laser printer 30 (S120). However, if there is status data from the laser printer 30 (S110: Yes), the data must be checked for a paper jam message (S130).

If the data indicates a paper jam has occurred (S130: Yes), the data must be checked further for a printing on the fly message (S140). If the data indicates the printer is printing on the fly (S140: Yes), the setting of the error recovery function must be checked (S150). If the error recovery function is ON (S150: Yes), the input prime signal (IP) is set to low (S160) in order to send a reset command to the laser printer 30. Then, data is retransmitted from the top of the page in which the paper jam occurred (S170). On the other hand, if the error recovery function is not ON (S150: No), the IP is set to low (S180), and the data for the page currently being transmitted is deleted until the end of the page (S190).

If a paper jam occurred but the printer is not printing on the fly (S140: No), steps S160 and S170 are executed the same as when the printer is printing on the fly, providing the error recovery function is ON (S200: Yes). If the error recovery function is not ON (S200: No), however, only the IP is set to low (S210). Since the printer is not printing on the fly, the data for the page in which the paper jam occurred has been completely output, making it unnecessary to delete data until the end of the page.

When the status data does not indicate a paper jam (S130: no), the data is checked for a print overrun message (S220). If a print overrun has occurred (S220: Yes), the IP is set to low (S180), regardless of the error recovery function setting, and a process is executed to delete data until the end of the page (S190). The error recovery setting is ignored because print overrun is a recurring error.

When receiving a command to set IP to low, the laser printer 30 executes a reset procedure, clearing the reception buffer 46 and the line buffer 48. When a paper jam occurs and the error recovery is set to ON, data for the page in which the paper jam occurred is received again and reprinted. When error recovery is set to OFF, data is received beginning from the top of the next page. If a print overrun occurs, however, the printer will skip that page and begin receiving data from the top of the next page, regardless of the error recovery setting.

Therefore, in the second embodiment, print overrun and paper jam errors that occur when printing can be smoothly recovered from without causing an illegal command error to occur and without repeating the same error.

Figure 2B:
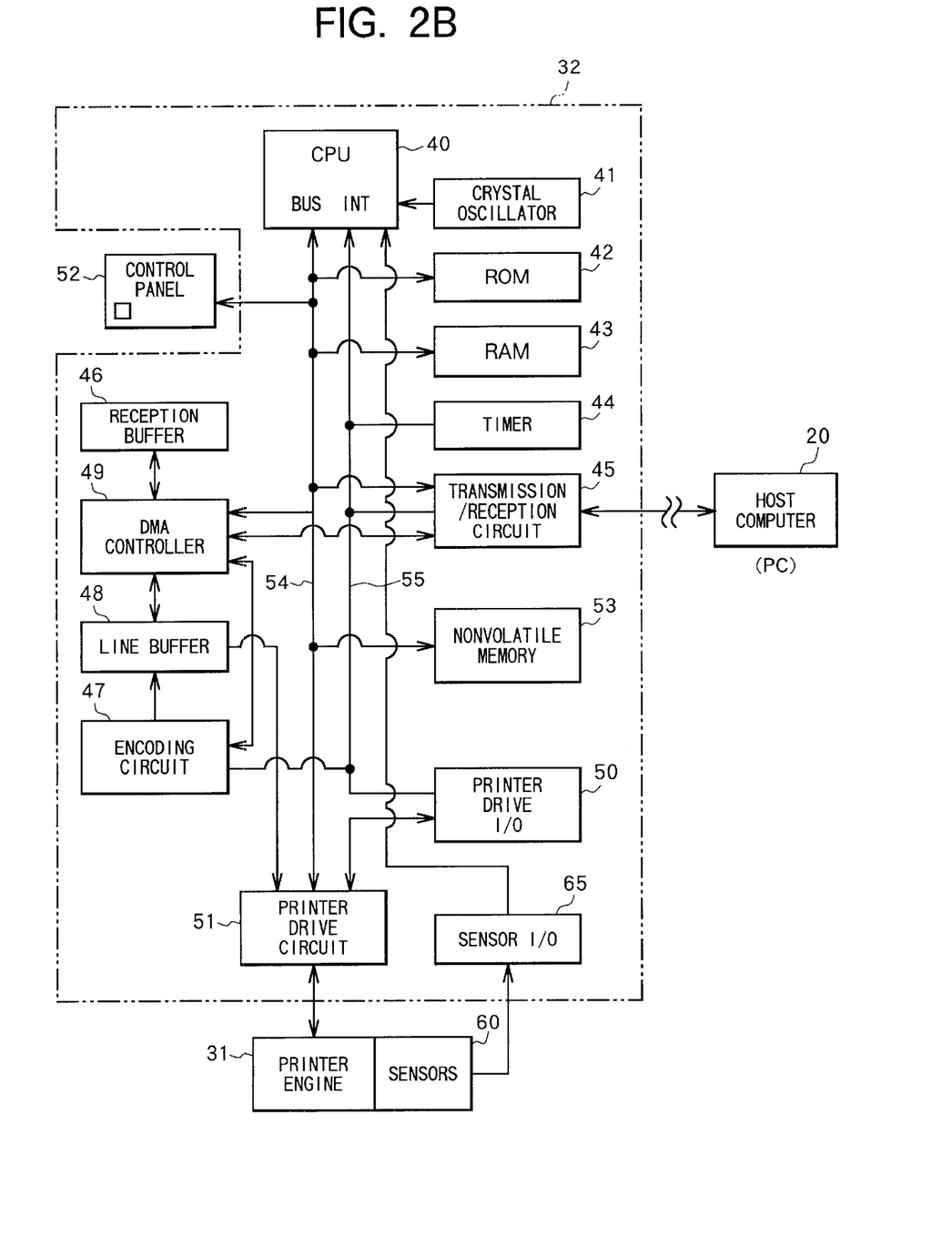
FIG. 2B shows the general configuration of a host-based printing system according to the third embodiment of the invention.

A third embodiment of the present invention will next be described while referring to FIGS. 2B, 6 and 7. FIG. 2B shows the control unit 32 which is similar to that shown in FIG. 2A except for the provision of a sensor I/O interface 65 for sensors 60 provided to the printer engine 31. The sensors 60 include a paper jam sensor for detecting when paper has become jammed. The CPU 40 receives detection signals from the sensors 60 during timer interrupts.

In the host-base printing system 10 provided with the control unit 32 shown in FIG. 2B, the following processes are executed in the host computer 20.

Figure 6:
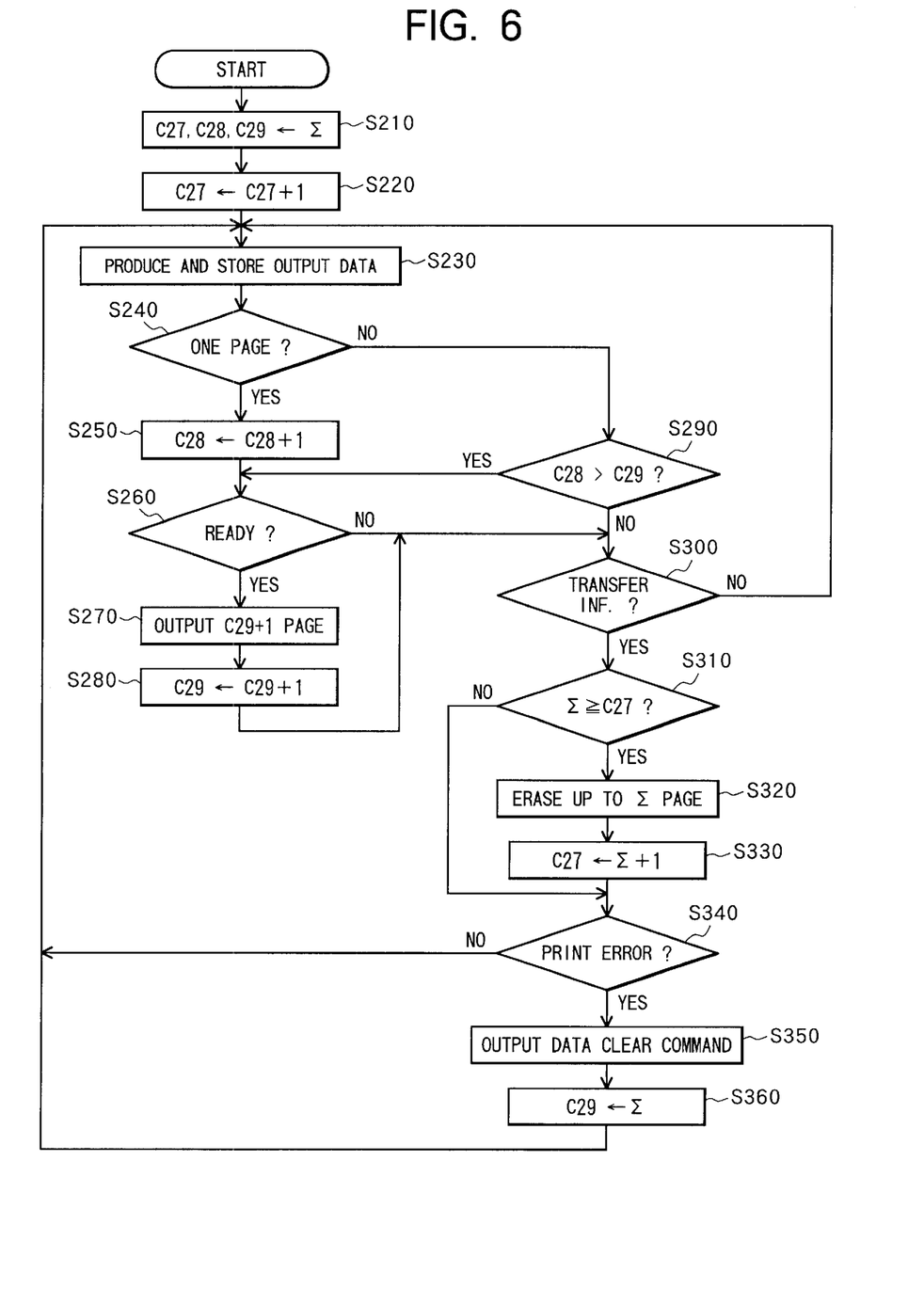
FIG. 6 is a flowchart showing the control process in a host computer of the third embodiment of the invention.

As shown in FIG. 6, when a print process starts, the host computer 20 requires the printer 30 to send an accumulated value Σ in the nonvolatile memory 53. The accumulated value Σ received from the printer 30 is stored set to respective counters 27 through 29 as an initial value (S210). Next, the count value C27 of the starting page counter 27 is incremented by one (S220). Output data is created by the application program 21 and the printer driver 22 and stored in the output data list 26 through the spooler 23 (S230). Next, whether or not one page worth output data has been stored in the output data list 26 is determined (S240). When the determination made in S240 is affirmative (S240: Yes), the count value C28 of the ending page counter 28 is incremented by one (S250). Next, based on the status information sent from the printer 30, it is confirmed that the printer 30 is ready for printing (S260). This step is necessary to carry out printing. When the printer 30 is ready for printing, data stored in the output data list 26 corresponding to (C29+1) page is output to the printer 30 (S270), and then the count number of the page output complete counter 29 is incremented by one (S280).

On the other hand, when the determination made in S240 is negative, it is determined that a relationship of C28>C29 is met (S290). This step is for determining whether or not more than one page worth of data has been stored in the output data list 26. When the determination made in step 290 is affirmative, the routine proceeds to S260 where data is output to the printer 30. In this manner, the output data is sequentially output on a page basis until sending of the last page data stored in the output data list 26 is complete.

When the printer 30 is busy or when C28≦C29, data is not output, and it is checked whether or not there is a transfer information from the printer (S300). When there exists the transfer information from the printer 30, the accumulated value Σ is retrieved from the nonvolatile memory 53 and determination is made as to whether or not a relation of Σ≧C27 is met (S310). It is to be noted that the accumulated value Σ represents the page that could successfully printed. Therefore, if Σ≧C27, it is no longer necessary to keep on holding the data up to the Σ page in the data currently stored in the output data list 26. The output data up to the Σ page is erased (S230) and the count value C27 in the counter 27 is set to Σ+1 (S330).

Next, it is checked if the print error has occurred in the printer 30 (S340). If the print error has not occurred, the routine returns to S220 whereupon storage of the output data in the output data list 26 is resumed. On the other hand, when the print error has occurred, a command is issued to the printer 30 to clear the reception data (S350). A printed page Σ is set to the count value C29 of the counter 29, whereupon the routine returns to S220 (S360). Whether or not the print error has occurred in the printer 30 is determined based on the contents of the transfer information transferred from the printer 30.

The third embodiment is configured so that after one page worth data is output, it is confirmed that the transfer data is prepared in the printer 30 (S280 to S300). Absent any information regarding print error or the like, the printed page Σ is set as the transfer information when the same has been updated. In such a situation, steps S310 et seq are also executed. In this case, however, since the print error has not occurred, the routine directly returns to S230 from S340.

Next, the control process of the printer 30 will be described.

Figure 7:
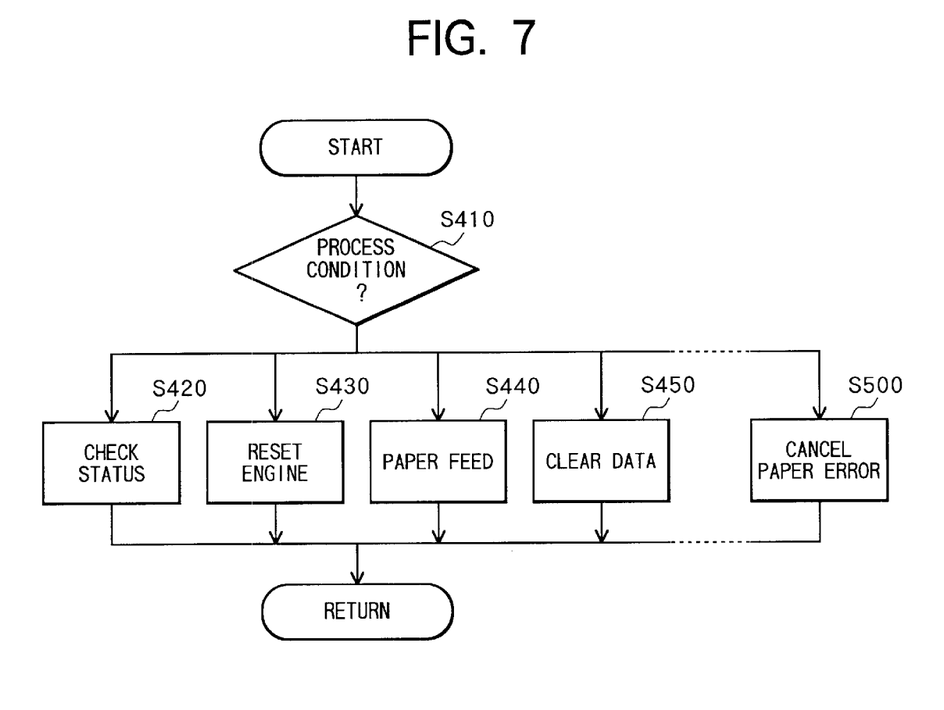
FIG. 7 is a flowchart showing the control process in the printer of the third embodiment of the invention.

As shown in FIG. 7, the printer 30 checks the current processing condition (S410), whereupon various processes including checking of the status (S420), resetting the engine (S430), feeding a paper (S440), cancellation of paper error (S500) and the like are executed. In the status check, the various kinds of sensors are checked. When the printer is incapable of receiving data from the host computer 20 by the detection of abnormality, such as a full reception buffer 46 or print error, a busy signal is output to the host computer 20 as a status signal. When a clear command for clearing the data received from the host computer 20 is output, the data in the reception buffer 46 and the line buffer 48 is cleared (S450).

With the arrangement as described above, the host-based printing system 10 according to the third embodiment will operate in a manner to be described below.

When, for some reason, a print error occurs in the printer 30, the printer 30 sends the busy signal to the host computer 20 as the status signal. Also, the printer 30 will prepare transfer information to be conveyed to the host computer 20 through a bi-directional communication in order to indicate that the print error has occurred. This transfer information together with the printed page Σ are output to the host computer 20 in response to the interrogation from the host computer 20 in the process of S300. Upon receipt of these pieces of data from the printer 30, the host computer 20 instructs the printer 30 to clear the reception data currently retained in the printer 30. Concurrently, the host computer 20 returns the output completion page to the printed page (S340 to S360). Accordingly, in the printer 30, the reception data is cleared (S450) to erase incomplete data. In the host computer 20, as a result of decrementing C29, the data on the page which results in print error is retransmitted in S260. In this case, it is required that the error on part of the printer 30 be resolved and the status of the printer return to a ready condition (S260: Yes). As such, in the third embodiment of the invention, the data for the print error page is retransmitted to allow the data to be printed. When performing reprinting, residual incomplete data does not remain in the printer so that printing trouble will not occur caused thereby.

When no printing error occurred, the leading data to be retained in the output data list 26 is specified based on the accumulated value Σ in the nonvolatile memory 53 each time one page worth data is output therefrom. The data corresponding to the pages preceding to the page in the current page is erased (S310 to S330). Thus, an extra amount of storage capacity needs not be provided in the output data list 26 to perform reprinting.

Although the present invention has been described with respect to specific embodiments, it will be appreciated by one skilled in the art that a variety of changes and modifications may be made without departing from the scope of the invention. For example, although, in the third embodiment, the accumulated value Σ of the print page number is retrieved and the initial values of the counters 27 through 29 are set, the initial values of the counters 27 through 29 may be zero and the number of pages counted from the start of print may be output from the printer.

What is claimed is:

1. A printing control method of a host-based printing system that comprises a host computer and a printer connected to said host computer, said printing control method comprising the steps of:

(a) creating, in said host computer, image data for printing;

(b) outputting said image data created in said host computer to said printer;

(c) printing, in said printer, said image data on a page basis;

(d) when a printing error occurs in said printer, determining whether said printing error is of a recurring type or nonrecurring type before said image data for a page in which said printing error occurred is completely output from said host computer to said printer;

(e) when said printing error is of a recurring type, recovering said printing error, and thereafter outputting remaining image data for said page to said printer;

(f) without storing remaining image data for said page, discarding, in said printer, said remaining image data for said page output from said host computer;

(g) resetting said printer and thereafter outputting image data for a subsequent page to said printer, and printing said image data for said subsequent page;

(h) when said printing error is of a nonrecurring type, instead of executing steps (e) and (f), recovering said printing error, and thereafter resending to said printer said image data for said page in which said printing error occurred and printing said image data resent by said host computer; and (i) resetting said printer before outputting said resent image data for said page to said printer.

2. A host-based printing system comprising:

a host computer for creating image data for printing and transmitting said image data;

a printer connected to said host computer for receiving and printing said image data on a page basis;

printing error cause determination means for determining whether a printing error is of a recurring type or non-recurring type;

error recovery means for recovering said printing error; and discarding means for discarding said image data, wherein when said printing error is of a recurring type, said error recovery means recovers said printing error, said host computer outputs remaining image data for a page in which said printing error occurred to said printer, said discarding means discards said remaining image data in said printer, said printer is reset, and said host computer outputs image data for a subsequent page to said printer, and wherein when said printing error is of a nonrecurring type, said error recovery means recovers said printing error, said printer is reset, and said host computer outputs said image data for said page in which said printing error occurred to said printer.

3. The host-based printing system according to claim 2, further comprising:

output complete determination means for determining whether said image data for a page had been completely transmitted from said host computer when said printing error occurred; and error recovery ignore means for disabling said error recovery means so that retransmitted image data is not printed by said printer when said printing error is of a recurring type.

4. The host-based printing system according to claim 3, wherein said error recovery means retransmits said image data for said page in which said printing error occurred after said printer recovers from said printing error;

wherein after said printer is reset, said discarding means discards a part of said image data for said page which remains untransmitted from said host computer when a determination by said output complete determination means indicates that said image data for a page had not been completely transmitted.

5. The host-based printing system according to claim 4, wherein said discarding means is provided in said printer and discards said part of the image data after said part of said image data has been transmitted to said printer.

6. The host-based printing system according to claim 2, further comprising:

page skipping means for skipping said image data for said page in which said printing error occurred.

7. A host-based printing system comprising:

a host computer for creating image data and outputting said image data;

a printer connected to said host computer for receiving and printing said image data on a page basis; and bi-directional communication lines for connecting said host computer to said printer so as to be capable of performing a bi-directional communication therebetween, wherein said printer comprises:

print execution information output means for outputting print execution information to said host computer, said print execution information being representative of normally printed pages and print error pages;

data clear means for clearing, when a printing error occurred during printing said image data for one page, a part of said image data for said page which remains unprinted as a result of said printing error;

printing error cause determination means for determining whether a printing error is of a recurring type or non-recurring type;

error recovery means for recovering said printing error;

wherein said host computer comprises:

image data retaining means for retaining said image data that has been output to said printer so as to repeatedly output to said printer;

resending means for resending to said printer said image data for said page that is indicated as a print error page in said print execution information; and discarding means for discarding said image data for a page that is retained in said image data retaining means and indicted as a normally printed page in said print execution information, and wherein when said printing error is of a recurring type, said error recovery means recovers said printing error, said host computer outputs remaining image data for a page in which said printing error occurred to said printer, said discarding means discards said remaining image data in said printer, said printer is reset, and said host computer outputs image data for a subsequent page to said printer, and wherein when said printing error is of a nonrecurring type, said error recovery means recovers said printing error, said printer is reset, and said host computer outputs said image data for said page in which said printing error occurred to said printer.

8. The host-based printing system according to claim 7, wherein said printer further comprises print results storing means for storing an accumulated number of printed pages and outputting said accumulated number of printed pages to said host computer, and wherein said host computer further comprises printed pages specifying means for specifying a number of normally printed pages based on said accumulated number of printed pages from said print results storing means before start of printing and an updated accumulated number of printed pages.

9. The host-based printing system according to claim 8, wherein said host computer further comprises output page managing means for managing a page whose image data has been output to said printer, and print error page specifying means for specifying print error pages based on a page managed by said output page managing means and said normally printed pages.

10. The host-based printing system according to claim 9, wherein when said print error page specifying means specifies a print error page, said output page managing means indicates a page immediately preceding a print error page specified by said print error page specifying means.

11. A host-based printing system comprising:

a host computer for creating image data; and a printer connected to said host computer for receiving and printing said image data on a page basis;

wherein said host computer comprises:

image data retaining means for retaining said image data;

start page managing means for managing a start page of said image data stored in said image data retaining means;

page managing means for managing an end page of said image data stored in said image data retaining means;

output page managing means for managing an output page which has been sent to said printer; and output data specifying means for specifying said image data for a subsequent page to be sequentially output to said printer based on a relationship between said output page and said end page, printing error cause determination means for determining whether a printing error is of a recurring type or non-recurring type;

error recovering means for recovering said printing error; and discarding means for discarding said image data for a page that is retained in said image data retaining means and indicated as a normally printed page in said print execution information, and wherein when said printing error is of a recurring type, said error recovery means recovers said printing error, said host computer outputs remaining image data for a page in which said printing error occurred to said printer, said discarding means discards said remaining image data in said printer, said printer is reset, and said host computer outputs image data for a subsequent page to said printer, and wherein when said printing error is of a nonrecurring type, said error recovery means recovers said printing error, said printer is reset, and said host computer outputs said image data for said page in which said printing error occurred to said printer.

12. The host-based printing system according to claim 11, wherein said start page managing means specifies a normally printed page based on information received from said printer and rewrites said start page based on said normally printed page specified by said start page managing means.

13. The host-based printing system according to claim 11, wherein said output page managing means specifies a print error page based on information received from said printer and rewrites said output page based on said print error page specified by said output page managing means.

* * * * *